United States Patent [19]

Giandenoto et al.

[11] Patent Number: 4,466,504
[45] Date of Patent: Aug. 21, 1984

[54] TRACTOR SEAT-OPERATED HYDRAULIC VALVE CONTROL

[75] Inventors: Frank J. Giandenoto, Racine; Anthony J. Saiia, Milwaukee, both of Wis.

[73] Assignee: Textron Inc., Providence, R.I.

[21] Appl. No.: 463,403

[22] Filed: Feb. 3, 1983

[51] Int. Cl.³ .............................................. B60K 25/00
[52] U.S. Cl. ...................................... 180/273; 56/10.5
[58] Field of Search ............... 180/273; 56/10.2, 10.5, 56/DIG. 15; 188/109

[56] References Cited

U.S. PATENT DOCUMENTS

| 710,508 | 10/1902 | Ott | 180/273 |
| 2,612,232 | 9/1952 | Morrison | 200/61.58 R |
| 3,229,452 | 1/1966 | Hasenbank | 56/10.5 |
| 3,334,488 | 8/1967 | Lauck | 180/273 |
| 3,590,564 | 7/1971 | Clifford | 56/10.2 |
| 3,736,729 | 6/1973 | Peterson | 56/10.5 |
| 3,918,240 | 11/1975 | Haffner | 56/7 |
| 3,969,875 | 7/1976 | Nofel | 56/10.2 |
| 4,178,741 | 12/1979 | Lonn | 56/7 |

Primary Examiner—Joseph F. Peters, Jr.
Assistant Examiner—D. Lynn Fugate
Attorney, Agent, or Firm—Arthur J. Hansmann

[57] ABSTRACT

A tractor seat-operated hydraulic valve control including a power tractor and a hydraulically powered implement connected with the tractor. A hydraulic valve on the tractor is controlled by a manual lever connected therewith and by a mechanical connection between a pivotally mounted operator's seat and the valve. When the operator is off the seat the control moves the valve to the neutral position.

10 Claims, 3 Drawing Figures

TRACTOR SEAT-OPERATED HYDRAULIC VALVE CONTROL

This invention relates to a tractor seat-operated hydraulic valve control, and, more particularly, it relates to a hydraulic valve control for a power implement of a tractor and which is controlled by the weight of the operator on the operator's seat.

BACKGROUND OF THE INVENTION

Seat-operated controls for tractors are already known in the art. They are used to shut off the power going to the implement on the tractor when the operator has left his seat. The seat is usually spring-loaded to move upwardly when the operator gets off the seat, and that upward movement controls elements responsive to the upward movement and which in turn control the power to implements or the like. For instance, U.S. Pat. No. 3,590,564 shows this type of seat controlled or safety device for lawn mowers mounted on a tractor, whereby the absence of the operator on the operator's seat actuates linkage to shut off the flow of power to the mower. However, these are two springs pulling in opposite directions to secure an idler pulley in an operative or inoperative position, and a handle overrides the springs. Further, that patented arrangement relies upon the relative strength of the two springs operating on an over-center lever arrangement, and the springs also are controlled by the vertical movement of the operator's seat, so those springs must serve a dual purpose. In those respects, the present invention differs from that shown in that patent, and the present invention provides for a spring-loaded operator's seat which directly and positively controls a manual control connected with a hydraulic valve which in turn governs the power to the tractor-mounted implement. As such, the present invention is of a nature different from that of the prior art and it is a control for accurate positioning of a hydraulic valve stem.

Other examples of the prior art utilizing control of power through the operator's seat are seen in U.S. Pat. Nos. 2,612,232 and 3,229,452 and 3,736,729 and 3,969,875 and 4,178,741. Those patent disclosures differ from the present invention in that they do not disclose the direct control of hydraulic power by means of the operator's seat and they basically relate to electric controls. U.S. Pat. No. 4,178,741 only shows an elaborate system of electric switches and solenoids for operating a hydraulic system under certain conditions, and it does not disclose a seat-operated safety device which position the system to the inoperative mode when the seat is unoccupied, all as in the present invention.

Generally speaking, the present invention relates to an improved and simplified seat-operated hydraulic valve control which positions the hydraulic valve in an inoperative position when the seat is unoccupied. By this arrangement, the hydraulic system which controls the implements on the tractor becomes inoperative when the operator gets off the seat. However, the control can be arranged such that while it precludes implement operation it can still allow for hydraulic power for other purposes, such as raising and lowering the implements, or the like, even though the operator is not occupying the seat. Thus, if the operator intentionally gets off the seat or falls off the seat the control operates to interrupt the hydraulic power to the implement, and it also allows the operator to operate the implement when he is not occupying the seat.

Further, the control arrangement of this invention also provides for a type of interlock switch which must be in a set position before the power can be commenced, and that set position can be established by the positioning of the control in the neutral position relative to powering the implement. In that regard, there is an additional safety feature in this invention.

DETAILED DESCRIPTION OF THE DRAWING

DETAILED DESCRIPTION OF THE PREFERRED EMBODIMENTS

Figure 1:
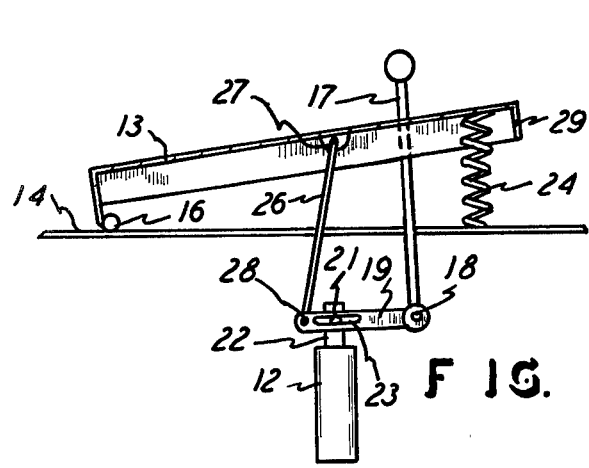
FIG. 1 is a side-elevational view of one embodiment of this invention.

The drawings show a fragment of a tractor 10 having an implement 11 suitably mounted thereon and controlled by a hydraulic valve 12. There is also shown a pivotally mounted operator's seat 13 suitably mounted on the frame 14 of the tractor 10 by means of a pivot rod 16. U.S. Pat. No. 3,918,240 discloses a tractor with a gang of lawn mowers attached thereto and with a hydraulic system for powering the mowers and for raising and lowering the mowers. As such, the said patent is similar to the aforesaid present disclosure, and the said patent is incorporated herein by means of reference thereto.

Figure 3:
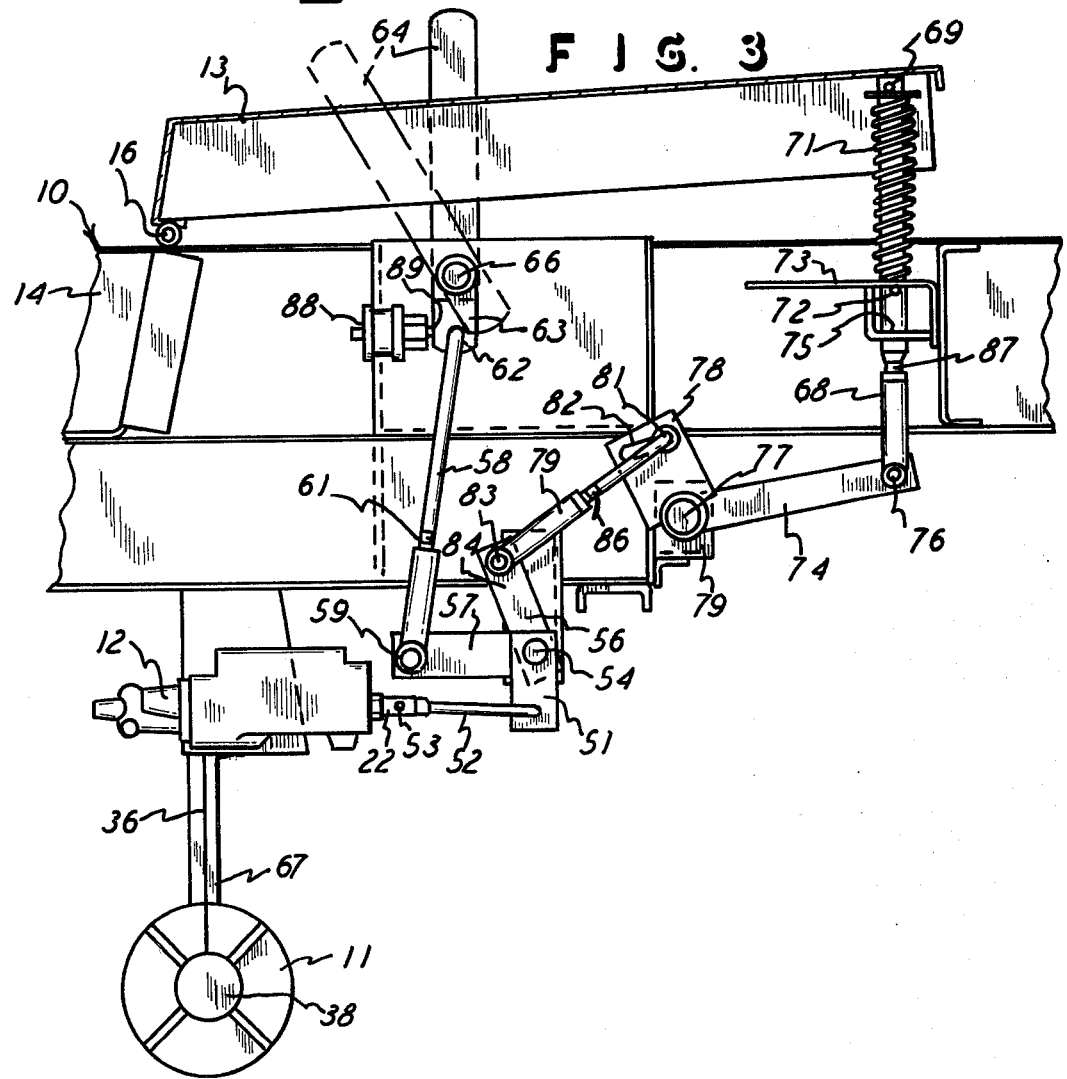
FIG. 3 is a side-elevational view of another embodiment of this invention.

FIG. 1 shows one embodiment of this invention wherein the tractor frame 14 is shown to have the pivotally mounted operator's seat 13 mounted thereon by means of the pivot pin 6, and a hydraulic valve 12 is suitably mounted on the frame 14 in any conventional arrangement. A control lever 17 extends adjacent the seat 13 and is pivotted on the tractor by means of the pivot shaft 18 being suitably mounted on the tractor, and an arm 19 extends laterally of the lever 18 in a fixed relation thereto, such as to form a bell crank with the elements 17 and 19 operating about the fixed pivot member 18. The arm 19 is pinned to the hydraulic valve 12 by means of a pin 21 extending from an end of a valve spool 22 which extends off the valve 12. A slot 23 in the arm 19 receives the pin 21 which is slidable therein so that the arm 19 can pivot about its fixed pin 18 and axially displace the spool 22 by engaging the pin 21 which thus slides in the slot 23. In that manner, the valve spool 22 can be axially moved in response to forward and backward movement of the lever 17 under the manual control of the operator. There is therefore a lost-motion type of connection between the pin 21 and the arm 19, and that is by virtue of the slot 23 to the extent that the pin 21 slides in the slot 23 which is also thus moving on an arc about the mounting shaft 18. It will of course be understood that the valve 12 is fixedly mounted on the tractor 10, as shown in FIG. 3, and the valve 12 also is hydraulically connected with an implement which in turn is mechanically connected with the tractor for positioning and raising and lowering of the implement, such as shown with the implement 11 in FIG. 3 and as disclosed in the U.S. Pat. No. 3,918,240, for instance.

A compression spring 24 is mounted on the tractor 10 and extends into connection with the seat 13 for urging the seat upwardly, to the position shown in FIG. 1, and, the operator's weight will pivot the seat 13 and compress the spring 24 to a position lower than that shown in FIG. 1. A flexible cable 26 or the like is connected to the seat 13 at its upper end 27 and is also suitably connected to the end of the arm 19 at its lower end 28. When the seat 13 is in the upward position shown, the cable 26 pulls upwardly on the arm 19 and thus axially moves the valve spool 22 upwardly by pivoting the arm 19 about its shaft 18. That places the valve 12 in a neutral position so that no hydraulic power can be transmitted to the hydraulically powered implement 11. That condition occurs when the operator is off the seat 13, and thus the implement 11 is not operating at that time. In fact, the spring 24, being at the rear end 29 of the seat 13 causes the control or cable 26 to firmly hold the arm 19 in the neutral position shown so that the valve 12 is not operating. Of course the control connection 27 is closer to the seat pivot 16 relative to the spring 24, and thus the spring 24 exerts the greater leverage on the seat 13, as mentioned. Further, since the cable 26 provides a lost motion connection when tension is released on the cable or control 26, and that is by virtue of the operator sitting on the seat 13, then the arm 19 is freed and thus the control lever 17 can be pivoted to axially move the valve spool 22 and thereby operate the valve 12 when desired.

Figure 2:
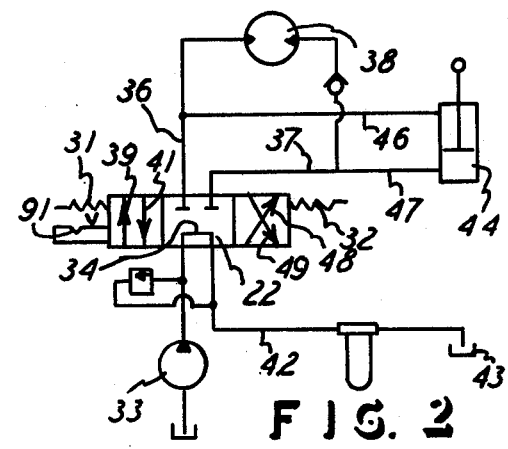
FIG. 2 is a schematic view of one hydraulic system which could be employed with this invention.

FIG. 2 shows one hydraulic system which may be employed in connection with the structure of FIG. 1, and the valve spool 22 is shown to have end springs 31 and 32 operating thereon for centering the spool in a position shown which is the neutral position. Thus a hydraulic pump 33 has suitable hydraulic connections to the spool 22 and is shown connected with the neutral passageway 34 on the spool 22. Other hydraulic connections, such as line 36 and line 37 extend to and from the spool 22 and connect with a hydraulic motor 38 which is the motor for powering the implement 11, for instance. Therefore, upon shifting the spool 22 to the right, as viewed in FIG. 2, the spool passageways 39 and 41 respectively connect with the lines 36 and 37 to permit the hydraulic pump 33 to pass powering hydraulic fluid to the motor 38 and drive the implement 11. A hydraulic return line 42 extends from the spool 22 and returns to the reservoir 43.

Further, where it is desired, the spool 22 can also be utilized for raising and lowering the implement 11, such as by means of the hydraulic cylinder assembly 44 which is connected with the spool 22 by means of the shown hydraulic lines 46 and 47. Thus, upon shifting the spool 22 to the left, as viewed in FIG. 2, the spool passageways 48 and 49 respectively connect with the lines 37 and 42 for passing the hydraulic fluid relative to the cylinder assembly 44, in the usual manner. However, in the embodiment shown in FIG. 3, the connection of spool 22 with a cylinder assembly 44 is not in that embodiment, but instead the valve 12 in the FIG. 3 embodiment would preferably have only the neutral position and the implement powering position.

FIG. 3 shows its hydraulic valve 12 having its extended spool 22 connected with a pivotal arm 51 through a link 52 pinned to the spool 22 by a pin 53. The arm 51 is mounted on a pivot shaft 54 supported on the tractor framepiece 56, and another pivot arm 57 is also piloted on the shaft 54 and pivots with the arm 51, in the nature of a bell crank, and an adjustable control linkage 58 is connected with the arm 57 to a pin 59. The arm 58 is threadably adjustable by threads 61 to be alterable in its length, and its upper end 62 pivotally connects with the lower end 63 of a control lever 65. The lever 64 is pivotted on the tractor 14 by means of the pivot shaft 66 fixed on the frame 14.

It will therefore be seen and understood that the manual control lever 64 is movable fore-and-aft of the tractor in a vertical plane, to thus move the control 58 essentially up and down and in the vertical plane for rocking or pivoting the arms 57 and 51 and thereby axially displacing the spool 22 for operating the hydraulic valve 12. When the lever 64 is moved to the dot-dash or forward position shown, then the spool 22 is moved inwardly relative to the valve 12 and that would be the operating or powering position for the valve 12, such that the spool passageways 39 and 41 of FIG. 2 are operatively connected with the motor 38 for operating the implement 11. In the upright and full-line position of the lever 64, the control or linkage described is such that the valve 12 is in the neutral or non-operating position.

The implement 11 is schematically shown to be mounted on and connected to the tractor 10 by means of a conventional mounting arm 67 which is suitably connected with the implement 11 which may be in the nature of a reel type of lawn mower indicated. Also, the driving motor 38 is shown operatively connected to and at the end of the reel 11, and the hydraulic line 36 is also shown extending between the valve 12 and the motor 38.

To position the valve 12 in neutral position when seat 13 is not occupied, and uprightly disposed and vertically movable member 68 is mounted on the frame 14 and extends into contact with the seat 13 at its upper end and carries a pin 69 which restrains a compression spring 71. A pin 72 is carried by member 68 and engages a tractor frame piece 73 to limit upward movement of the member 68 when the seat is unoccupied, and another tractor frame piece 75 engages the pin 72 when the seat is pivotted downwardly, and therefore the downward movement of the member 68 and the seat 13 is limited. The lower end of the member 68 is connected with a rocker arm 74 by means of a pin 76, and the arm 74 is pivotted on the tractor frame 14 by means of the pivot shaft 77 mounted on the frame 14. Also, another arm 78 is connected relative to the arm 74 and shaft 77 to present a bell crank with the arm 74, and the supporting shaft 77 is mounted on the tractor frame piece 79. The safety or override control also includes a link 79 which as its end 81 extending into a slot 82 on the arm 78, and the other end of the link 79 connects with a pin 83 on an arm 84 effectively fixed with the shaft 54 to rotate therewith and thus determine the pivotted or rotated position of the bell crank presented by arms 51 and 57.

It will therefore be seen and understood that when the seat 13 is in the unoccupied and therefore raised position shown in FIG. 3, the member 68 has moved vertically upwardly to rotate the members 74 and 78 counterclockwise about their mounting shaft 77 and thus also bear downwardly on the link 79 through its end 81 in the end of the slot 82 as shown, and therefore rotate the arms 84 and 57 and 51 in the counterclockwise direction which extends the spool 22 on the valve 12 to the established neutral position described. In that position, the lever 64 is in its solid line position which is shown to be vertical. From that position, the lever 64 cannot be moved to the operating or dot-dash line position since the linkage described, along with the spring 71, is holding the lever 64 in its non-operating position, as desired, until the spring 71 is overcome.

Conversely, when the seat is occupied and is therefore moved downwardly, the member 68 has moved downwardly and thus the end 81 of the link 79 is free relative to the arm 78, since the slot 82 has effectively then moved rightwardly, as viewed in FIG. 3, and thus the lever 64 can then be pivotted forwardly to an operating position for the valve 12 in driving the motor 38. The particular lever arms and linkage shown in extending from the system from the member 68 and through the arm 84 is arranged to provide sufficient holding force, through the various lengths of lever arms shown, so that the lever 64 will securely move to its inoperative position and will be held in that position in a firm manner. Specifically, the lengths of the arms 56 and 78 are short and thus require ample force to overcome their positions as established by the extended spring 71 when in the inoperative position. Also, the link 79 has threads 86 thereon, for adjusting the overall length of the link 79 and thereby adjusting the setting of that linkage system with respect to the vertical movement permissable by the member 68 on the tractor frame, and the member 68 also has threads 87 for adjusting its length for the purpose mentioned.

An interlock electric switch 88 is mounted on the frame 14 and has its actuator 9 exposed to the end 63 of the lever 64 and thereby can be utilized to ensure that the lever 64 must be in its upright and neutral position and thus effective on the switch 88 for the interlock effect or relative to the tractor engine or the like.

As such, the control connected with the seat 13 is in the nature of an over-ride control which is movable downwardly to one position which corresponds with the neutral position of the valve 12. The link end 81 and the arm slot 82 form the nature of a lost-motion connection in that there can be movement of one member without corresponding movement of the connected member. Thus, from the FIG. 3 shown position, the operator can depress the seat 13 without automatically causing the lever 64 to move to an engaged position. The valve has a detent 91 for the powering positions, and the springs 31 and 32 urge the spool for the neutral position which is a precise position to be established by the accurate system described.

With the operator off the seat in either embodiment, he can move the lever 17 or 64 against the force of springs 24 and 71, respectively, and thereby operate the valves 12 to establish the implement-operative mode. Again, release of the lever 17 and 24 will effect an automatic return to the neutral position.

What is claimed is:

1. A tractor seat-operated hydraulic valve control, comprising a powered tractor, a hydraulically powered implement connected with said tractor, a hydraulic valve and a hydraulic motor operatively interconnected and operatively connected with said implement for powering said implement, said hydraulic valve having a neutral position where no fluid is passed to said hydraulic motor, a manual control mounted on said tractor and operatively connected with said hydraulic valve for controlling the flow of fluid through said valve and to said hydraulic motor, said manual control including a pivotally mounted member interconnected with said valve for operating said valve, including setting said valve in said neutral position, an uprightly disposed and vertically movable member having its lower end interconnected with said pivotally mounted member for positioning said pivotally mounted member in said neutral position, when said vertically movable member is in an upward position, a vertically movable operator's seat on said tractor, a spring on said tractor and operative on said seat for moving said seat to an upward position in the absence of the weight of the operator on said seat, and said vertically movable member being connected with said operator's seat and being movable to said upward position along with said seat for positioning said pivotally mounted member in said neutral position.

2. The tractor seat-operated hydraulic valve control as claimed in claim 1, wherein said vertically movable member includes a lost motion connection in the interconnection between said pivotally mounted member and said operator seat.

3. A tractor seat-operated hydraulic valve control, comprising a powered tractor, a hydraulically powered implement connected with said tractor, a hydraulic valve and a hydraulic motor operatively interconnected and operatively connected with said implement for powering said implement, said hydraulic valve having a neutral position where no fluid is passed to said hydraulic motor, a manual control mounted on said tractor and operatively connected with said hydraulic valve for controlling the flow of fluid through said valve and to said hydraulic motor, an over-ride control movably mounted on said tractor to one position and interconnected with said hydraulic valve for moving said hydraulic valve to said neutral position, a vertically movable operator's seat mounted on said tractor and connected with said over-ride control and being downwardly movable under the weight of an operator for actuating said over-ride control in a direction away from said one position, and a spring on said tractor and operatively related to said seat for moving said seat upwardly when said seat is not occupied by the operator and to thereby move said over-ride control to said one position for restricting operation of said hydraulic motor.

4. A tractor seat-operated hydraulic valve control, comprising a powered tractor, a hydraulically powered implement connected with said tractor, a hydraulic valve and a hydraulic motor operatively interconnected and operatively connected with said implement for powering said implement, said hydraulic valve having a neutral position where no fluid is passed to said hydraulic motor, said valve having an axially movable valve spool extending thereon, a manual control mounted on said tractor and including a pivotal member mounted for pivotal movement in the vertical plane and being pinned to said valve spool for axial displacement of said valve spool upon pivotal movement of said pivotal member, including setting said valve in said neutral position, a vertically mounted operator's seat on said tractor, a spring on said tractor and operative on said seat for moving said seat to an upward position in the absence of the weight of the operator on said seat, and means interconnected between said seat and said pivotal member and responsive to the vertical movement of said seat and being dimensioned to move and position said pivotal member in said neutral position in said upward position of said seat.

5. The tractor seat-operated hydraulic valve control as claimed in claim 4, wherein said means includes a lost motion connected in the interconnection between said seat and said pivotal member.

6. The tractor seat-operated hydraulic valve control as claimed in claim 5, wherein said valve neutral position is a central position for said valve spool, and said lost-motion connection has its lost-motion action disposed for movement of said spool in only one axial direction from said central position.

7. The tractor seat-operated hydraulic valve control as claimed in claim 4, wherein said manual control includes a bell crank pivotal on said tractor in a vertical plane and with one end of said bell crank being pinned with said valve spool, and said means being movable in the vertical plane and directly connected with said bell crank for limiting pivotal movement of said bell crank.

8. The tractor seat-operated hydraulic valve control as claimed in claim 4, wherein said means includes two bell cranks on separate axes and operable in vertical planes for multiple crank action.

9. The tractor seat-operated hydraulic valve control as claimed in claim 4, wherein said means includes a lost-motion connection arranged for positioning said pivotal member in said neutral position at one end of said lost-motion connection, and arranged for movement of said pivotal member in only one direction from said neutral position.

10. The tractor seat-operated hydraulic valve control as claimed in claim 4, including a switch mounted on said tractor and operated by said manual control and being connected with the power of said tractor for controlling same when said manual control is in one position.

* * * * *